Oct. 21, 1952
R. H. RINES
2,615,087
COLOR TELEVISION SYSTEM
Filed April 17, 1944.
2 SHEETS—SHEET 1
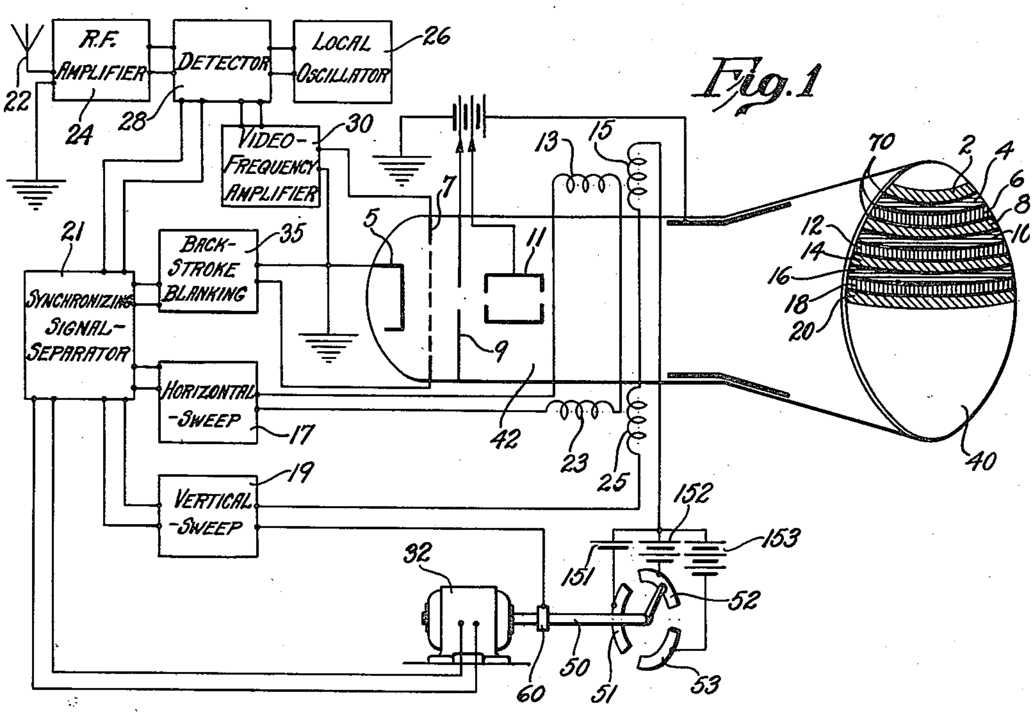
Fig. 1
Fig. 2 Horizontal Sweep Triggering Pulses.
Fig. 3 Output of Blanking Cct. 35
Fig. 4 Horizontal Sweep
Fig. 5 Vertical Scan
Fig. 6 Layer Scanning
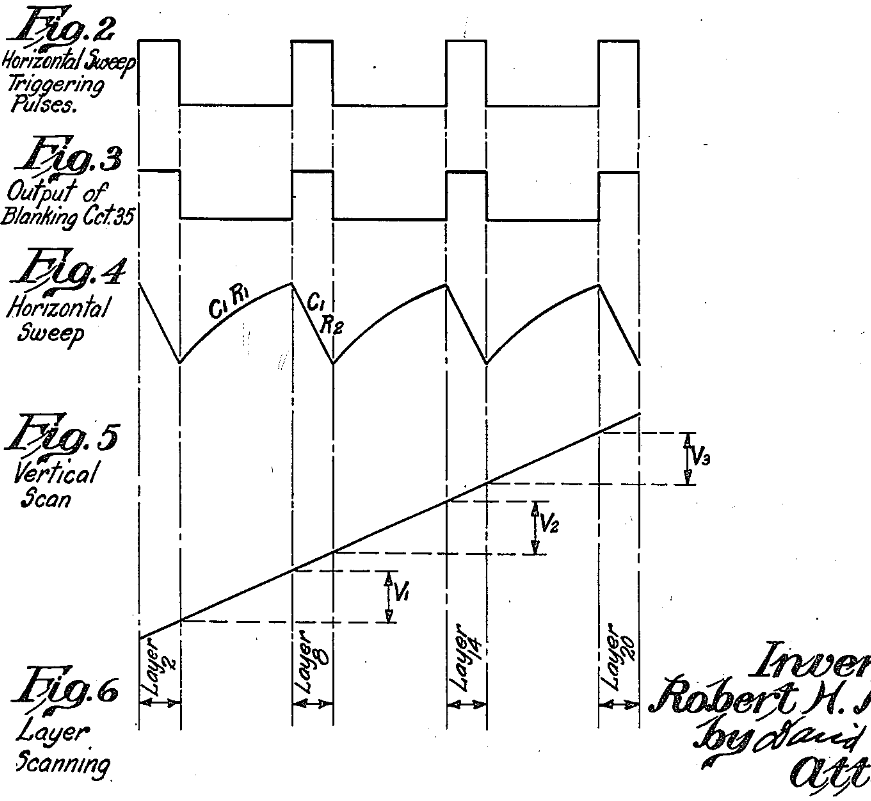
Inventor
Robert H. Rines
by David Rines
Attorney Fig. 7 Vertical Sweep Synchronizing Pulses. Fig. 8 Color Filter at Transmitter. Fig. 9 Vertical Sweep at Receiver. Fig. 10 Phosphor Grating Scanned at Receiver.
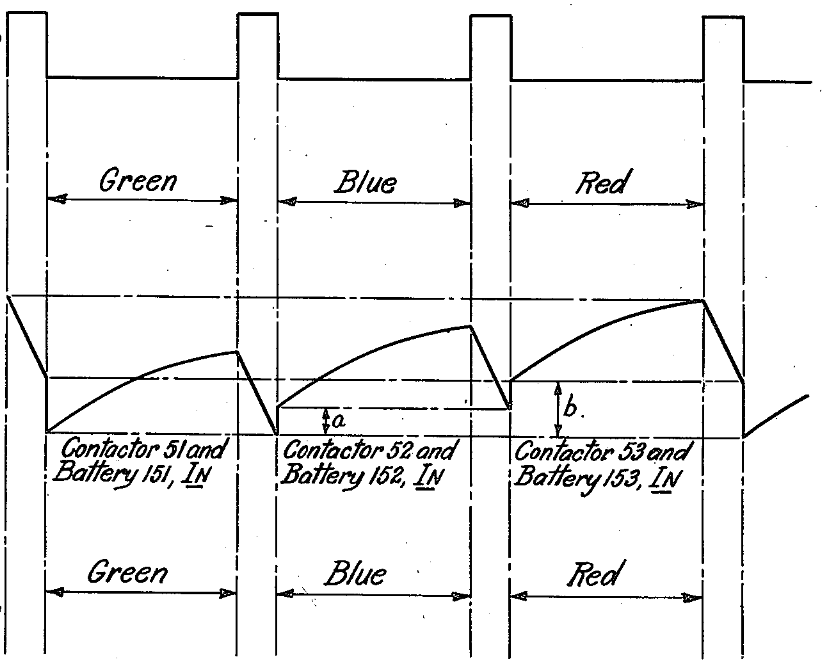
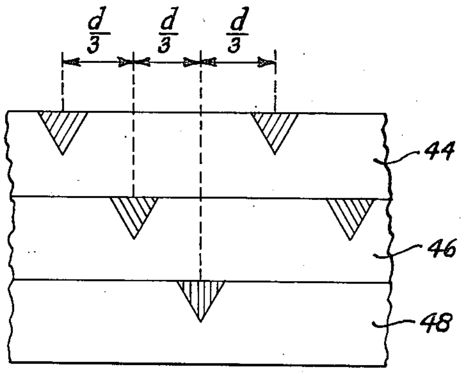
Fig. 11
Inventor
Robert H. Rines
by David Rines
Attorney Patented Oct. 21, 1952 2,615,087

UNITED STATES PATENT OFFICE 2,615,087

COLOR TELEVISION SYSTEM

Robert Harvey Rines, Brookline, Mass.

Application April 17, 1944, Serial No. 531,451

31 Claims. (Cl. 178—5.4)

The present invention relates to electric systems, and more particularly to television-receiving systems that, while having more general fields of usefulness, are especially adapted for use in color television.

In the prior art, color television has been accomplished by allowing a color disc to rotate in front of the iconoscope or other common type of television-transmitting tube. The optical field produced on the iconoscope mosaic has been scanned by the electron stream of the iconoscope while each color disc was in front of the tube. A similar disc, at the receiving station, has been synchronized with the disc at the transmitter so that, as the electron stream of the display-cathode-ray tube at the receiver reproduced the fields scanned at the transmitter, the appropriate color disc was in front of the receiver-oscilloscope. The successive color scans occurred at such a rate of speed that they appeared as a single image in its true colors.

An object of this invention is to provide a new and improved color-television-receiving system.

A further object is to provide a novel color-television system that shall eliminate the need for bulky moving parts, such as color filters.

A further object is to provide a complete color-image-producing system contained in a cathode-ray tube, with no external parts other than the synchronizing and impulse circuitry associated with the receiving system.

It has been proposed to print lines or strips of differently colored luminescent material on a screen, thereby forming a mosaic of interlaced luminescent strips positioned inside the cathode-ray tube. This process calls for coating the luminescent material on a supporting screen. The inherent overlapping of the luminescent material, coated as thus proposed, and the sympathetic luminescence of adjacent strip coatings render these proposals disadvantageous.

It has also been proposed to provide a series of sets of metal strips coated with luminescent material and electrically charged in synchronism with the transmitter color disc to cause the scan of a particular set of strips. Such a construction and scanning procedure is intricate and complicated.

A further object of the present invention, therefore, is to overcome these complexities by using a new and simple type of mosaic, ruled to provide a grating, the rulings of which are filled with luminescent material. As will be later pointed out, such a system permits the screen to be actually the cathode-ray-tube face itself, thus lending itself to present manufacturing methods, insures against sympathetic luminescence of adjacent rulings, and adapts itself to extremely simple scanning procedures.

Still a further object is to provide simple methods of making these grated mosaics.

Other and further objects will be explained hereinafter, and will be particularly set forth in the appended claims.

The invention will now be more fully explained in connection with the accompanying drawings, in which Fig. 1 is a diagrammatic view of circuits and apparatus embodying the invention as incorporated in a common color-television-receiving system; Figs. 2 to 10 represent explanatory diagrams and wave forms; and Fig. 11 is a view of a cathode-ray-tube screen illustrating a feature of the present invention.

An antenna 22 receiving the radio-frequency transmission from a sending station (not shown) feeds a radio-frequency amplifier 24 which, in turn, feeds into a detector 28 that is superheterodyned by a local oscillator 26. Part of the output of the detector 28 is fed to the video-frequency amplifier 30 which controls the voltage between the cathode 5 and the control grid 7 of the display cathode-ray oscilloscope 42. Thus, electrons emitted from the cathode 5, in response to the energizing of the control grid 7, will pass in quantities dependent upon the signal strength transmitted during a particular scan of the iconoscope mosaic at the transmitter. The detector 28 also feeds a synchronizing signal-separator 21 that separates out the triggering pulses for the horizontal-sweep circuit 17, the vertical-sweep circuit 19, the backstroke blanking circuit 35, and the motor 32, which, in most color-television circuits, is used to revolve a color filter. The horizontal-sweep circuit feeds the deflector coils 13, 23 and produces periodically the "line-scan," while the vertical-sweep circuit 19 periodically energizes the coils 15 and 25 to effect the "field-scan." All this is according to well-known television techniques.

The screen face 40 of the cathode-ray tube 42 is of unique construction. It involves the providing of depressions in the face of the screen within the cathode-ray tube for holding the phosphorescent luminescent material. Among the advantages of such a construction are the obviating of overlapping and consequent edge-luminescing effects between adjacent portions of a pattern of luminescent material on the screen, since the luminescent material is confined to the depressions; the resulting clarity and sharpness of luminescent indication provided by the electron stream impinging upon the luminescent material confined to the depression; the rendering more difficult the dislodging and burning-off of the luminescent material by the electron stream; and the adaptability for accurate mass-production of particular luminescent-material patterns as a result of the use of easily reproducible depressions. While this feature of the present invention, therefore, is of general use for cathode-ray-tube screens and the like wherever the above advantages and others are sought, it is particularly adapted for use in the above-described illustration of color television.

Thus, in Fig. 1, for the color-television use, a pattern of depressions is provided in the cathode-ray-tube screen 40 that constitutes a grating, ruled in the face itself, with successive substantially equally spaced lines of the grating filled with various types of phosphors. The depth of the grating or grooved area may be about 0.002 millimeter. The width of each ruling, however, should preferably be just slightly larger than the width of the electron stream in the cathode-ray tube 42 in order that, among other reasons, the degree of accuracy required of the hereinafter described biasing and scanning system be not too great. The anodes 9 and 11 may be adjusted to produce an extremely fine stream, about one-fourth the width of the customary television electron stream. If every four gratings from the top, such as 2, 8, 14, 20, etc., are filled with, say, zinc orthosilicate, then a green phosphorescent screen has been created, and an electron stream striking any layer 2, 8, 14, 20, etc., will produce a green color on the scope face 40. Similarly, gratings 4, 10, 16, etc., might be filled or embedded with zinc oxide so that an electron stream striking any of these layers would produce a blue luminescence on the scope face. And a red or yellow or any desired color phosphor may occupy the remaining set of rulings 6, 12, 18, etc.; for example, zinc beryllium silicate.

A plurality of like sets of areas including a first area 2, 4, 6 and a last area, not shown, are thus provided on the screen 40 on which the electron stream impinges, each set having a plurality of like sub-areas or layers all extending in the same direction, which may be assumed to be horizontal. The first set of areas is provided with the successively disposed sub-areas or layers 2, 4 and 6 equally spaced along a direction perpendicular to the first-named direction, which may therefore be vertical. The second set of areas is provided with successively disposed sub-areas or layers 8, 10 and 12, similarly equally spaced vertically. The third set of areas is provided with successively disposed sub-areas or layers 14, 16 and 18 also equally spaced vertically. The fourth set of areas is provided with successively disposed sub-areas or layers 20, etc., likewise equally spaced vertically, and so on. The sub-areas or layers 2, 8, 14, 20, etc. of the sets of areas are similar, corresponding to green. They are substantially equally spaced along the vertical direction between the first green layer 2 in the first area 2, 4, 6 and a last green layer in the last area, not shown. The sub-areas or layers 4, 10, 16, etc., of the sets of areas are also similar, but corresponding to blue. They are likewise equally spaced vertically between the first blue layer 4 in the first area 2, 4, 6 and a last blue layer in the last area, not shown. The sub-areas or layers 6, 12, 18, etc., of the sets of areas are likewise similar, but corresponding to red. The red layers are also equally spaced vertically between the first red layer 6 in the first area 2, 4, 6 and a last red layer in the last area, not shown. The sub-areas or layers of each area are thus colored in sequence to correspond to the sequence of colors of the filter at the transmitter.

Three sets of gratings have been provided, and an electron stream hitting any set will give luminescence of a color depending on the type of phosphor in that set. The three primary colors may easily be used as mentioned above, so that the set 2, 8, 14, 20, etc., gives green luminescence, the set 4, 10, 16, etc., blue; and the set 6, 12, 18, etc., red.

Each groove or ruling is separated from its adjacent rulings by the non-phosphor material 70 of the face 40. Since the luminescent material is embedded in the grooves of the face 40, the non-luminescent material 70 is in the same plane as the top of the luminescent material so that the face material 70 effectively prevents sympathetic luminescence of adjacent grooves.

It is desired to cause the electron stream to successively scan each set of rulings. For example, the stream will scan the ruling 2, then the ruling 8, then the ruling 14, then the ruling 20, etc., until all the layers of this green set have been scanned. Then it is desired to cause the electron stream to scan ruling 4, then ruling 10, then ruling 16, etc., until the second or blue set has been scanned. The stream should then start scanning layer 6, then 12, then 18, etc., until the third or red set has been scanned. At such a time, it is desired to start all over with the first or green set.

If we assume that there is sufficient voltage in the vertical deflector coils 15, 25 to cause the electron stream to impinge on the layer 2, and that the horizontal-sweep circuit quickly scans the layer 2, then it is only necessary that, at the end of this scan, the electron stream be blanked out until such a time as the vertical-sweep voltage would be sufficient to cause the stream to impinge on the layer 8, the next layer of the same phosphor. If this is repeated throughout the whole of one scanning process, then we could accomplish a complete scan of one phosphor-grating.

To make this so, all that is needed is to adjust the time constants of the recovery circuit of the periodic horizontal-sweep circuit 17, to such a value that, in the corresponding period of time, the vertical-sweep circuit shall have produced a sufficient voltage change to cause the next horizontal scan to occur at the proper lever of operation on the scope face on the next similar phosphor layer.

In Fig. 2, the synchronizing pulses that trigger the horizontal-sweep circuit 17 are shown. Fig. 4 shows the charging and discharging sweeps of the horizontal-sweep circuit 17. Assume that the scan of any layer by the electron stream takes place during the discharge period shown as $C_1R_2$, and that the back-stroke, or recovery, of the stream occurs during $C_1R_1$. Fig. 3 shows the negative pulses applied to the grid 7 of the cathode-ray tube 42 during this recovery period $C_1R_1$, so that during such period no electrons reach the scope face 40. In Fig. 5, it is shown that during this period $C_1R_1$, the vertical-sweep circuit 19 has built up voltage increments shown as $V_1$, $V_2$ and $V_3$ which are sufficiently large to cause the next horizontal scan $C_1R_2$ to occur on the proper layer. Thus, as shown in Fig. 6, the first scan takes place on layer 2, the next on layer 8, the following on layer 14, . . . layer 20, etc.

Thus the condition of scanning only one complete set of similar phosphor layers 2, 8, 14, 20, etc., has been accomplished, and, say, a green image is produced on the screen 40.

It remains to produce a means of causing the next set of blue phosphor layers 4, 10, 16, etc., to be scanned during the following vertical sweep. In accordance with the present invention, the electron beam or stream is biased by pre-set biasing voltages applied at the time of the initiation of the next vertical sweep voltage and hence prior to the commencement of the next vertical sweep, thereby to insure that the stream will commence the next vertical scanning with the top color layer of the next color—in this case, the top blue layer 4. While the said biasing may obviously be effected in well-known ways, the drawings illustrate a convenient technique in accordance with which the vertical sweep is caused to produce an initial voltage at the commencement of the next vertical sweep that will start the first horizontal sweep on layer 4 instead of layer 2. Then the set corresponding to layer 4, or the blue grating, will be scanned. This is accomplished by a switching mechanism 50, as follows.

The motor 32, which is commonly used to drive a color disc, identical with that at the transmitter, can drive a switch 50 which successively connects with contactors 53, 52 and 51, at the time the red, blue and green filters are respectively in front of the transmitter iconoscope to present these respective colors in sequence to the transmitter. Contactors 51, 52 and 53 allow different biasing voltages, as produced by batteries 151, 152 and 153, respectively, to be applied to the electron-stream position-biasing device, in this case, to the vertical deflection coils 15, 25 to produce the proper color selection on the display tube. The voltage values of the biasing batteries 151, 152 and 153 increase in sequence to correspond to the spacing between the first layer and the other layers of each area. The increase in voltage of the battery 152 over that of the battery 151 thus corresponds to the spacing between the layers 2 and 4, 8 and 10, 14 and 16, and so on, and the increase in voltage of the battery 153 over that of the battery 151 corresponds to the spacing between the layers 2 and 6, 8 and 12, 14 and 18, and so on. If it be assumed that the top grating 2 is a green phosphor, and every fourth grating is identical, then, while contactor 50 makes with contactor 51, the green filter disc at the transmitter is scanning the iconoscope. The vertical-sweep voltage will feed through the slip ring 60 and contactor 50 and contactor 51 and biasing battery 151, to the vertical deflection coils 15, 25, and will cause the electron stream in the cathode-ray tube 42 to scan each green ruling as previously described. Thus a picture of the televised object viewed by the iconoscope through a green filter appears as a green image on the receiver cathode-ray tube 42 on the grating of green phosphor. Definition will be good particularly if the width of the iconoscope electron stream is at least three to four times the width of the very fine stream preferable in the receiver. This restriction is rather essential since the intensity gradations produced in the scanning of the iconoscope are reproduced at the receiver on a screen, only selected parts of which will produce luminescence during any particular scan.

After the green phosphor has been scanned and an image produced corresponding to the green object televised by the iconoscope, the color filter at the transmitter revolves so that, say, the blue filter next comes into play. Switch 50, by virtue of its synchronization with the transmitter color disc, then makes contact with the contactor 52, which causes a greater biasing voltage from the battery 152, corresponding to the separation or spacing between a blue and green layer, to be applied to the vertical deflection coils 15, 25. The first horizontal scan will therefore not take place along the layer 2, as previously, but, due to the additional bias voltage from the battery 152, will take place along the layer 4, the first blue layer. Thus will a scan of the blue phosphor be produced. If distance $d/3$ represents the separation or spacing of the green from the blue rulings, then the biasing battery 152 must produce a corresponding bias voltage that will deflect the stream a vertical distance $d/3$.

Similarly, when the red color disc is scanning the transmitter, contactor 53 at the receiver will cause the battery 153 to produce sufficient bias so that the first horizontal scan takes place on the layer 6, the first of the red phosphors.

It is well known that color has a diffusing effect upon the human eye, so that fewer scanning lines may be usually needed to produce a good definition color image than to produce a corresponding black and white image. This means that there can be wider separations between successive horizontal scans in producing a color image. The distance $d$ between successive similar phosphor layers should be so arranged, accordingly, that this diffusing effect produces a complete and well-defined image on the color phosphor gratings.

Fig. 7 illustrates the synchronizing pulses triggering the vertical-sweep circuit 19, once to each scan of the iconoscope transmitter. Fig. 8 shows the position of the color filter at the transmitter during such scans. Fig. 9 shows how contactors 51, 52 and 53 put in enough additional voltage during respective scans at the receiver cathode-ray tube 42 to cause the scans to occur first of the green layers, then of the blue, and then of the red.

The bias voltage represented by $a$ in Fig. 9 is produced by battery 152 and is sufficient to cause the new set of horizontal scans to occur a displacement $d/3$ below the first level of operation on the layer 2; i. e., on layer 4. Similarly, the voltage $b$ shows the additional $d/3$ bias voltage put on by the battery 153, to cause a scan initiating with the top red phosphor 6. The switch 50, in between successive connections to the contactors 51, 52 and 53, during the back-stroke or discharges of the vertical-sweep voltage, as illustrated in Fig. 9, disconnects the vertical-sweep circuit 19 from the vertical deflection coils 15, 25, thereby providing convenient backstroke blanking. Fig. 10 shows the color phosphor scanning sequence.

The observer thus sees three successive different-colored images, slightly displaced from one another. If this displacement is small enough, and it can be made so by using fine gratings and by adjusting the anodes 11 and 9 to produce an extremely fine electron stream to fill the gratings, the observer will not be able to detect the slight displacement of the three scans, and will see but one image in its true colors.

A simple method of constructing the novel cathode-ray-tube screens of the present invention will now be described, applied to the complete oscilloscope grating illustration. Rule an independent grating on each of three thin transparent sheets 44, 46, 48, such as fine glass. Suppose the separation of the ruling is *d*. Moisten each sheet, and then dry off the sheet. The rulings will remain damp. The application of a powdered phosphor to the sheet, and the subsequent dusting off of the sheet, will leave the gratings full of phosphor. These same moistening, drying and luminescent-material-filling steps, of course, are equally applicable to other types of depression patterns, too. Thus, in the above illustration, three separate phosphor gratings have been made. Each sheet, of course, is a useful cathode-ray-tube screen. Where it is desired to obtain a composite assembly of interlaced screens, as for multi-color purposes, it merely remains to position the sheets so as to stagger the gratings so that a complete interlaced three-color grating is produced. If the top grating of the second thin sheet be placed a distance $d/3$ from the top grating of the first sheet, and the top grating of the third sheet is placed $d/3$ below the top grating of the second sheet, then gratings two and one, and three and two, respectively, can be joined, if desired, at the outer edges with glass cement, producing a three-color grating.

Further modifications will occur to persons skilled in the art, and all such are considered to fall within the spirit and scope of the invention, as defined in the appended claims.

What is claimed is:

1. A transparent screen for incorporation at the front of a cathode-ray tube having an electron stream, the screen being provided on its face adapted to be disposed inside the tube facing the electron stream with a plurality of depressions each containing luminescent material of width larger than the width of the electron stream.

2. A mosaic that comprises several thin sheets each rule *d* to provide a grating, the ruling of each grating being filled with luminescent materials, and the sheets of gratings being joined with the rulings of the respective sheets staggered to interlace them.

3. A cathode-ray tube having a screen provided with a face disposed inside the tube ruled with a series of grooves to provide a grating, the grooves containing multi-colored luminescing materials, and means for producing an electron stream to scan the materials in order to cause them to luminesce, the luminescing materials being disposed in scanning paths along areas of width larger than the width of the electron stream.

4. A color-television receiver having a screen provided with a plurality of like sets of areas including a first area and a last area each having a plurality of like layers extending in a first direction constituted of material that luminesces in response to the action thereon of an electron stream, the luminescent material of the layers of each area luminescing in colors in sequence, similarly luminescing color layers of the successively disposed areas being substantially equally spaced along a second direction between a first similarly luminescing color layer in the first area and a last similarly luminescing color layer in the last area, means for producing an electron stream for impinging on the screen, a plurality of voltage sources having predetermined voltage values increasing in sequence to correspond to the spacing between the first layer and the other layers of each area, a first deflection means for deflecting the electron stream periodically to cause the electron stream to scan the layers successively in the first direction, a second deflection means, a sweep circuit for producing a periodic sweep voltage, means connecting the sweep circuit to the second deflection means to cause the second deflection means, during each sweep of the periodic sweep voltage, to deflect the electron stream upon the conclusion of the scanning of each layer from each scanned layer of each color to the next adjacently disposed layer of similar luminescing color until all of the similarly luminescing color layers from the first said similarly luminescing color layer to the last said similarly luminescing color layer have been scanned, and means operable upon the completion of the scanning of the last layers and prior to the commencement of each next following sweep of the periodic sweep voltage to add the voltages of the plurality of voltage sources in the order of their increase in sequence to the periodic sweep voltage of the sweep circuit in order to impinge the electron stream upon the first layer of the color next in sequence to the said first similarly luminescing color layer.

5. A color-television receiver having a screen provided with a plurality of like sets of areas including a first area and a last area each having a plurality of like layers extending in a first direction constituted of material that luminesces in response to the action thereon of an electron stream, the luminescent material of the layers of each area luminescing in colors in sequence, similarly luminescing color layers of the successively disposed areas being substantially equally spaced along a second direction between a first similarly luminescing color layer in the first area and a last similarly luminescing color layer in the last area, means for producing an electron stream for impinging on the screen, a plurality of voltage sources having predetermined voltage values increasing in sequence to correspond to the spacing between the first layer and the other layers of each area, a first deflection means for deflecting the electron stream periodically to cause the electron stream to scan the layers successively in the first direction, a second deflection means, a sweep circuit for producing a periodic sweep voltage, means connecting the sweep circuit to the second deflection means to cause the second deflection means, during each sweep of the periodic sweep voltage, to deflect the electron stream upon the conclusion of the scanning of each layer from each scanned layer of each color to the next adjacently disposed layer of similar luminescing color until all of the similarly luminescing color layers from the first said similarly luminescing color layer to the last said similarly luminescing color layer have been scanned, means operable upon the completion of the scanning of the last layers and prior to the commencement of each next following sweep of the periodic sweep voltage to add the voltages of the plurality of voltage sources in the order of their increase in sequence to the periodic sweep voltage of the sweep circuit in order to impinge the electron stream upon the first layer of the color next in sequence to the said first similarly luminescing color layer, and means for disconnecting the periodic sweep voltage from the second deflection means during the period between the completion of the scanning of the last layers and the commencement of the next following sweep of the periodic sweep voltage.

6. A color television receiver having a screen provided with a plurality of like sets of areas including a first area and a last area each having a plurality of like horizontally-extending layers constituted of material that luminesces in response to the action thereon of an electron stream, the luminescent material of the layers of each area luminescing in colors in sequence, similarly luminescing color layers of the successively disposed areas being substantially equally spaced vertically between a first similarly luminescing color layer in the first area and a last similarly luminescing color layer in the last area, means for producing an electron stream for impinging on the screen, a plurality of voltage sources having predetermined voltage values increasing in sequence to correspond to the vertical spacing between the first layer and the other layers of each area, a first deflection means for deflecting the electron stream periodically to cause the electron stream successively to scan the layers horizontally, a second deflection means, a vertical-sweep circuit for producing a periodic vertical-sweep voltage, means connecting the vertical-sweep circuit to the second deflection means to cause the second deflection means, during each sweep of the periodic vertical-sweep voltage, to deflect the electron stream upon the conclusion of each horizontal scan from each scanned layer of each color vertically to the next adjacently disposed layer of similar luminescing color until all of the similarly luminescing color layers from the first said similarly luminescing color layer to the last said similarly luminescing color layer have been scanned, and means operable upon the completion of the scanning of the last layers and prior to the commencement of each next following sweep of the periodic vertical-sweep voltage to add the voltages of the plurality of voltage sources in the order of their increase in sequence to the periodic vertical-sweep voltage of the vertical-sweep circuit in order to impinge the electron stream upon the first layer of the next color in sequence to the said first similarly luminescing color layer.

7. A color television receiving system having, in combination, a receiver having a screen provided with a plurality of like sets of grooved areas including a first area and a last area each having a plurality of like grooves extending in a first direction and filled with material that luminesces in response to the action thereon of an electron stream, the luminescent material in the grooves of each area luminescing in colors in sequence, the grooves containing the similarly luminescing color luminescent material of the successively disposed areas being substantially equally spaced along a second direction between a first groove containing similarly luminescing color luminescent material in the first area and a last groove containing similarly luminescing color luminescent material in the last area, means for producing an electron stream for impinging on the screen, a plurality of voltage sources having predetermined voltage values increasing in sequence to correspond to the spacing between the first groove and the other grooves of each area, a first deflection means for deflecting the electron stream periodically to cause the electron stream to scan the grooves successively in the first direction, a second deflection means, a sweep circuit for producing a periodic sweep voltage, means connecting the sweep circuit to the second deflection means to cause the second deflection means, during each sweep of the periodic sweep voltage, first to deflect the electron stream upon the conclusion of the scanning of each groove from each scanned groove containing luminescent material of each luminescing color to the next adjacently disposed groove containing luminescent material of similar luminescing color until all of the grooves containing the similarly luminescing color luminescent material from the first said groove containing the similarly luminescing color luminescent material to the last said groove containing the similarly luminescing color luminescent material have been scanned, and means operable upon the completion of the scanning of the last grooves and prior to the commencement of each next following sweep of the periodic sweep voltage to add the voltages of the plurality of voltage sources in the order of their increase in sequence to the periodic sweep voltage of the sweep circuit in order to impinge the electron stream upon the first groove containing luminescent material of the color next in sequence to the said first groove containing the similarly luminescing color luminescent material.

8. A color television receiving system having, in combination, a receiver having a screen provided with a plurality of like sets of areas including a first area and a last area each having a plurality of like layers extending in a first direction constituted of material that luminesces in response to the action thereon of an electron stream, the luminescent material of the layers of each area luminescing in colors in sequence, similarly luminescing color layers of the successively disposed areas being substantially equally spaced along a second direction between a first similarly luminescing color layer in the first area and a last similarly luminescing color layer in the last area, means for producing an electron stream for impinging on the screen, a first deflection means for deflecting the electron stream periodically to cause the electron stream to scan the layers successively in the first direction, a second deflection means, a sweep circuit for producing a periodic sweep voltage, means connecting the sweep circuit to the second deflection means to cause the second deflection means, during each sweep of the periodic sweep voltage, first to deflect the electron stream upon the conclusion of the scanning of each layer from each scanned layer of each color to the next adjacently disposed layer of similar luminescing color until all of the similarly luminescing color layers from the first said similarly luminescing color layer to the last said similarly luminescing color layer have been scanned, and means operable upon the completion of the scanning of the last layers and prior to the commencement of each next following periodic sweep voltage for biasing the position of the electron stream in order to impinge the electron stream upon the first layer of the color next in sequence to the said first similarly luminescing color layer.

9. A color television receiving system having, in combination, a receiver having a screen provided with a plurality of like sets of areas including a first area and a last area each having a plurality of like layers extending in a first direction constituted of material that luminesces in response to the action thereon of an electron stream, the luminescent material of the layers of each area luminescing in colors in sequence, similarly luminescing color layers of the successively disposed areas being substantially equally spaced along a second direction between a first similarly luminescing color layer in the first area and a last similarly luminescing color layer in the last area, means for producing an electron stream for impinging on the screen, a plurality of voltage sources having predetermined voltage values increasing in sequence to correspond to the spacing between the first layer and the other layers of each area, a first deflection means for deflecting the electron stream periodically to cause the electron stream to scan the layers successively in the first direction, a second deflection means, a sweep circuit for producing a periodic sweep voltage, means connecting the sweep circuit to the second deflection means to cause the second deflection means, during each sweep of the periodic sweep voltage, first to deflect the electron stream upon the conclusion of the scanning of each layer from each scanned layer of each color to the next adjacently disposed layer of similar luminescing color until all of the similarly luminescing color layers from the first said similarly luminescing color layer to the last said similarly luminescing color layer have been scanned, and motor-driven contactor means operable upon the completion of the scanning of the last layers and prior to the commencement of each next following sweep of the periodic sweep voltage to add the voltages of the plurality of voltage sources in the order of their increase in sequence to the periodic sweep voltage of the sweep circuit in order to impinge the electron stream upon the first layer of the color next in sequence to the said first similarly luminescing color layer.

10. A system for producing a likeness of an object in the original colors of the object having, in combination, means for receiving signals corresponding to the object in its primary colors, a cathode-ray tube having a screen provided with a plurality of like sets of areas including a first area and a last area each having a plurality of like layers extending in a first direction constituted of material that luminesces in response to the action thereon of an electron stream, the luminescent material of the layers of each area luminescing in the primary colors in sequence to correspond to the primary colors of the object, similarly luminescing primary-color layers of the successively disposed areas being substantially equally spaced along a second direction between a first similarly luminescing primary-color layer in the first area and a last similarly luminescing primary-color layer in the last area, means for producing an electron stream for impinging on the screen, a plurality of voltage sources having predetermined voltage values increasing in sequence to correspond to the spacing between the first layer and the other layers of each area, a first deflection means for deflecting the electron stream periodically to cause the electron stream to scan the layers successively in the first direction, a second deflection means, a sweep circuit for producing a periodic sweep voltage, means connecting the sweep circuit to the second deflection means to cause the second deflection means, during each sweep of the periodic sweep voltage, to deflect the electron stream upon the conclusion of the scanning of each layer from each scanned layer of each primary color to the next adjacently disposed layer of similar luminescing primary color until all of the similarly luminescing primary color layers from the first said similarly luminescing primary-color layer to the last said similarly luminescing primary-color layer have been scanned, means operable upon the completion of the scanning of the last layers and prior to the commencement of each next following sweep of the periodic sweep voltage to add the voltages of the plurality of voltage sources in the order of their increase in sequence to the periodic sweep voltage of the sweep circuit in order to impinge the electron stream upon the first layer of the primary color next in sequence to the said first similarly luminescing primary-color layer, and means responsive to the receiving means for modulating the electron stream as it scans the similarly luminescing primary-color layers with the received signals corresponding to the corresponding primary colors of the object.

11. A system for producing a likeness of an object in the original colors of the object having, in combination, means for receiving signals corresponding to the object in its three primary colors, a cathode-ray tube having a screen provided with a plurality of like sets of areas including a first area and a last area each having three like layers extending in a first direction constituted of material that luminesces in response to the action thereon of an electron stream, the luminescent material of the three layers of each area luminescing in the primary colors in sequence to correspond to the three primary colors of the object, similarly luminescing primary-color layers of the successively disposed areas being substantially equally spaced along a second direction between a first similarly luminescing primary-color layer in the first area and a last similarly luminescing primary-color layer in the last area, means for producing an electron stream for impinging on the screen, three voltage sources having predetermined voltage values increasing in sequence to correspond to the spacing between the first layer and the other layers of each area, a first deflection means for deflecting the electron stream periodically to cause the electron stream to scan the layers successively in the first direction, a second deflection means, a sweep circuit for producing a periodic sweep voltage, means connecting the sweep circuit to the second deflection means to cause the second deflection means, during each sweep of the periodic sweep voltage, to deflect the electron stream upon the conclusion of the scanning of each layer from each scanned layer of each primary color to the next adjacently disposed layer of similar primary luminescing color until all of the similarly luminescing primary-color layers from the first said similarly luminescing primary-color layer to the last said similarly luminescing primary-color layer have been scanned, means operable upon the completion of the scanning of the last layers and prior to the commencement of each next following sweep of the periodic sweep voltage to add the voltages of the three voltage sources in the order of their increase in sequence to the periodic sweep voltage of the sweep circuit in order to impinge the electron stream upon the first layer of the primary color next in sequence to the said first similarly luminescing primary-color layer, and means responsive to the receiving means for modulating the electron stream as it scans the similarly luminescing primary-color layers with the received signals corresponding to the corresponding primary colors of the object.

12. A method of constructing a luminescent screen that comprises ruling grooves in the face of the screen to provide a grating, moistening the screen, drying the face of the screen, and inserting luminescent material in the moistened grooves of the screen.

13. A method of constructing a luminescent screen that comprises ruling grooves in the face of the screen to produce a grating, moistening the screen, drying the face of the screen, applying powdered luminescent material to the screen, and dusting the powdered luminescent material off the face of the screen in order to leave the moistened grooves of the screen containing luminescent material.

14. A method of constructing a luminescent screen that comprises ruling several independent gratings on each of several thin transparent sheets, filling the rulings on each sheet with luminescent materials, positioning the sheets to stagger the gratings and joining the positioned sheets to maintain the gratings staggered.

15. A method of constructing a multi-colored luminescent screen that comprises ruling several independent gratings on each of several thin sheets, filling the rulings on each sheet with a particular-color luminescing material, positioning the sheets to stagger the gratings and joining the positioned sheets of gratings such that the assembly of joined sheets shall provide a screen of interlaced multi-color luminescing rulings.

16. A multi-colored luminescent screen that comprises several thin sheets ruled to provide gratings, the rulings of each sheet being filled with a particular-color luminescing material, and the sheets being joined with the rulings of the respective sheets staggered such that the assembly of joined sheets shall provide a screen of interlaced multi-color luminescing rulings.

17. A color-television receiving system for receiving color-television signals having, in combination, a display-cathode-ray tube having a screen provided with a face ruled with a series of grooves to provide a grating, the grooves being filled with luminescent materials that luminesce in various colors in response to the action thereon of an electron stream, means for producing an electron stream for impinging on the screen, means for deflecting the electron stream in one direction, means for deflecting the electron stream in a second direction at an angle to the said one direction, and means including a motor for connecting successively larger biasing voltages in series circuit with the last-named deflecting means for energizing the last-named deflecting means to cause the electron stream successively to scan luminescent materials that luminesce in similar colors.

18. A system for producing a likeness of an object in the original colors of the object having, in combination, means for receiving signals corresponding to differently colored portions of the object, a cathode-ray tube having a screen provided with a face and means for producing an electron stream impinging on the face, the face being provided with a series of grooved areas filled with phosphors that luminesce in different colors in response to the action thereon of the electron stream to provide differently colored luminescent areas, means for causing the electron stream to scan the face along the luminescent areas, contactor means operated in synchronism with the received signals for connecting bias voltages into circuit with the scanning means to cause the electron stream successively to scan luminescent areas that luminesce in similar colors, and means controlled in accordance with the respective signals received by the receiving means for producing on the screen a likeness of the object, the luminescent areas being caused to luminesce during the scanning in response to the respective signals received by the receiving means to represent the colors of the corresponding portions of the object.

19. A system for producing a likeness of an object in the original colors of the object having, in combination, means for receiving signals corresponding to differently colored portions of the object, a cathode-ray tube having a screen provided with a face and means for producing an electron stream impinging on the face, the face being provided with a series of grooved areas filled with different luminescent materials, means for causing the electron stream to scan the face, the different luminescent areas of the face being adapted to respond in different colors to the action of the electron stream, contactor means operated in synchronism with the received signals for connecting bias voltages into circuit with the scanning means to cause the electron stream successively to scan luminescent areas that luminesce in similar colors, and means controlled by the signals received by the receiving means for producing on the screen a likeness of the object, the response of different areas of the face to the action of the electron stream being controlled in accordance with the respective received signals to produce upon different portions of the likeness colors corresponding to the colors of the corresponding portions of the object.

20. A system for producing a likeness of an object in the original colors of the object having, in combination, means for receiving signals corresponding to differently colored portions of the object, a cathode-ray tube having a screen provided with a face grooved to provide a grating and means for producing an electron stream impinging on the face, means for causing the electron stream to scan the face along the grooved areas, the face being provided with a plurality of like sets of grooved areas, each set having a plurality of like sub-areas filled with color-responding material, corresponding sub-areas of the faces being adapted to respond with the same color to the action of the electron stream, contactor means operated in synchronism with the received signals for connecting bias voltages into circuit with the scanning means to cause the electron stream successively to scan sub-areas that respond with the same color, and means controlled in accordance with the signals received by the receiving means for producing on the screen a likeness of the object and for modifying the action of the electron stream upon the sub-areas to cause different portions of the likeness to be colored with the colors of corresponding portions of the object.

21. A system for producing a likeness of an object in the original colors of the object having, in combination, means for receiving signals corresponding to differently colored portions of the object, a cathode-ray tube having a screen and means for producing an electron stream impinging on the screen, means for causing the electron stream to scan the screen, the screen having a face ruled to provide a plurality of like sets of grooved areas, each set having a plurality of like sub-areas filled with color-responding material, corresponding sub-areas of the screen being adapted to respond with the same color to the action of the electron stream, the colors corresponding to the respective sub-areas being arranged in the same sequence in the sets of areas, means including a motor-driven contactor for connecting bias voltages into circuit with the scanning means for causing the scanning means to scan each corresponding sub-area of the sets of sub-areas in sequence, and means controlled in accordance with the signals received by the receiving means for producing upon the sub-areas portions of a likeness corresponding to the differently colored portions of the object and for modifying the action of the electron stream upon the sub-areas to cause the said portions of the likeness to be colored with the colors of the corresponding portions of the object.

22. A system for producing a likeness of an object in the original colors of the object having, in combination, means for receiving signals corresponding to the object in its primary colors, a cathode-ray display tube having a luminescent screen and means for producing an electron stream impinging on the screen, means for causing the electron stream to scan the screen, the screen having a face ruled to provide a plurality of like sets of grooved areas, each set having a plurality of like primary-color-responsive subareas filled with luminescent material that luminesce in primary colors, corresponding subareas of the screen being adapted to respond with the same primary color to the action of the electron stream, the primary colors corresponding to the respective sub-areas being arranged in the same sequence in the sets of areas, means including a motor-driven contactor for connecting bias voltages into circuit with the scanning means for causing the scanning means to scan each corresponding sub-area of the sets of sub-areas in sequence, means for preventing the scanning means from scanning other sub-areas of the sets of areas during the scanning of particular sub-areas of the sets of areas, and means controlled in accordance with the signals received by the receiving means for producing upon the sub-area portions of the screen superposed likenesses of corresponding portions of the object in their different primary colors.

23. A system for producing a likeness of an object in the original colors of the object having, in combination, means for receiving signals corresponding to the object in its primary colors, a cathode-ray display tube having a luminescent screen having a face ruled to provide a grating, the rulings being filled with luminescent material, and means for producing an electron stream impinging on the screen, means for causing the electron stream to scan the grating, means controlled in accordance with the signals received by the receiving means and comprising a horizontal-sweep-circuit for producing upon the screen superposed likenesses of portions of the object in their different primary colors, means comprising a vertical-sweep-circuit for causing the producing means to produce superposed likenesses of the remaining portions of the object in their different primary colors, and motor-driven contactor means operated in synchronism with the received signals for connecting bias voltages into circuit with the vertical-sweep-circuit to cause the electron stream to produce successive complete superposed likenesses of the object upon the grating in their different primary colors.

24. A cathode-ray tube having a screen that comprises several independent sets of grooves ruled on each of several thin transparent sheets, the grooves on each sheet being filled with luminescent materials and the sheets being joined with the grooves of the respective sheets stagger, and means for producing an electron stream for impinging on the screen.

25. A cathode-ray tube having a screen that comprises several independent sets of grooves ruled on each of several thin sheets, the grooves on each sheet being filled with a particular-color-luminescing luminescent material and the sheets being joined with the grooves of the respective sheets staggered such that the assembly of joined sheets provides a screen of interlaced multi-color-luminescing grooves, and means for producing an electron stream for impinging on the screen.

26. A cathode-ray tube having a screen that comprises several independent sets of grooves ruled on each of several thin sheets, the grooves on each sheet being filled with a particular-color-luminescing luminescent material and the sheets being joined with the grooves of the respective sheet staggered such that the assembly of joined sheets provides a screen of interlaced multi-color-luminescing grooves, means for producing an electron stream for impinging on the screen, and means for causing the electron stream to scan successively the like-colored grooves of each set of grooves.

27. A color-television receiving system having, in combination, a display-cathode-ray tube having a screen provided with a face ruled with a series of grooves to provide a grating, the grooves being filled with luminescent materials that luminesce in various colors in response to the action thereon of an electron stream, means for producing an electron stream for impinging on the screen, means for periodically deflecting the electron stream in one direction, means for deflecting the electron stream in a second direction at an angle to the said one direction, and means for connecting successively larger biasing voltages in series circuit with the last-named deflecting means, said last-named deflecting means being adjusted to deflect the electron stream in the said second direction during the periods between successive deflections by the first-named deflecting means sufficiently to cause the electron stream successively to scan luminescent material that luminesces in a similar color.

28. A system for producing a likeness of an object in the original colors of the object having, in combination, means for receiving signals corresponding to the object in its primary colors, a cathode-ray display tube having a luminescent screen having a face ruled to provide a grating the rulings of which are filled with luminescent materials that luminesce in various colors in response to the action of an electron stream and means for producing an electron stream impinging on the screen, means for causing the electron stream to scan the grating, means controlled in accordance with the signals received by the receiving means and comprising a horizontal-sweep-circuit for periodically producing upon the screen superposed likenesses of portions of the object in their different primary colors, means comprising a vertical-sweep-circuit for causing the producing means to produce superposed likenesses of the remaining portions of the object in their different primary colors, and means operated in synchronism with the received signals for connecting bias voltages into circuit with the vertical-sweep-circuit, the vertical-sweep-circuit being adjusted to deflect the electron stream vertically during the periods between successive sweeps by the horizontal-sweep-circuit sufficiently to cause the electron stream to produce successive complete superposed likenesses of the object upon the grating in their different primary colors.

29. A mosaic comprising a plurality of sheets each provided with a set of like layers of luminescent materials, the sheets being disposed in parallel planes with the layers of the respective sheets staggered to interlace them.

30. A method of constructing a luminescent screen that comprises ruling a grating on each of a plurality of sheets, inserting luminescent materials in the rulings on each sheet, and positioning the sheets to stagger the gratings, thereby to interlace them.

31. A multi-colored luminescent screen comprising a plurality of sheets respectively provided with sets of like layers comprising respectively differently luminescing color luminescent materials, the differently luminescing color layers of the respective sheets being staggered to interlace them.

ROBERT HARVEY RINES.

REFERENCES CITED

The following references are of record in the file of this patent:

UNITED STATES PATENTS

| Number | Name | Date |
|---|---|---|
| 1,467,132 | Bilstein | Sept. 4, 1923 |
| 1,934,821 | Rudenberg | Nov. 14, 1933 |
| 1,969,573 | Montgomery et al. | Aug. 7, 1934 |
| 1,988,605 | Michelssen | Jan. 22, 1935 |
| 2,083,203 | Schlesinger | June 8, 1937 |
| 2,096,986 | Von Ardenne | Oct. 26, 1937 |
| 2,200,285 | Lorenzen | May 14, 1940 |
| 2,287,415 | Burnett | June 23, 1942 |
| 2,294,820 | Wilson | Sept. 1, 1942 |
| 2,296,908 | Crosby | Sept. 29, 1942 |
| 2,301,254 | Carnaham | Nov. 10, 1942 |
| 2,307,188 | Bedford | Jan. 5, 1943 |
| 2,310,863 | Leverenz | Feb. 9, 1943 |
| 2,312,792 | Bamford | Mar. 2, 1943 |
| 2,330,604 | Messner | Sept. 28, 1943 |
| 2,337,980 | Du Mont et al. | Dec. 28, 1943 |
| 2,340,227 | Russell | Jan. 25, 1945 |
| 2,389,039 | Goldsmith | Nov. 13, 1945 |
| 2,389,646 | Sleeper | Nov. 27, 1945 |
| 2,389,979 | Huffnagle | Nov. 27, 1945 |
| 2,415,059 | Zworykin | Jan. 28, 1947 |
| 2,416,056 | Kallmann | Feb. 18, 1947 |

FOREIGN PATENTS

| Number | Country | Date |
|---|---|---|
| 508,037 | Great Britain | Jan. 26, 1939 |